(12) United States Patent
Kouznetsov et al.

(10) Patent No.: US 7,231,440 B1
(45) Date of Patent: *Jun. 12, 2007

(54) SYSTEM AND METHOD FOR DISTRIBUTING PORTABLE COMPUTER VIRUS DEFINITION RECORDS WITH BINARY FILE CONVERSION

(75) Inventors: Victor Kouznetsov, Aloha, OR (US); Andrei Ushakov, Hillsboro, OR (US)

(73) Assignee: McAfee, Inc., Santa Clara, CA (US)

( * ) Notice: Subject to any disclaimer, the term of this patent is extended or adjusted under 35 U.S.C. 154(b) by 700 days.

This patent is subject to a terminal disclaimer.

(21) Appl. No.: 09/740,617

(22) Filed: Dec. 18, 2000

(51) Int. Cl.
  G06F 15/173 (2006.01)
  G06F 15/177 (2006.01)
  G06F 7/00 (2006.01)

(52) U.S. Cl. ............... 709/224; 709/220; 709/223; 707/1; 707/3

(58) Field of Classification Search ........... 709/220, 709/223–224; 707/1, 3
See application file for complete search history.

(56) References Cited

U.S. PATENT DOCUMENTS

| | | | |
|---|---|---|---|
| 5,559,960 A * | 9/1996 | Lettvin | 713/200 |
| 5,802,277 A * | 9/1998 | Cowland | 713/200 |
| 5,960,170 A * | 9/1999 | Chen et al. | 714/38 |
| 6,021,510 A * | 2/2000 | Nachenberg | 714/38 |
| 6,029,256 A * | 2/2000 | Kouznetsov | 714/38 |
| 6,067,410 A * | 5/2000 | Nachenberg | 703/28 |
| 6,073,239 A * | 6/2000 | Dotan | 713/200 |

(Continued)

FOREIGN PATENT DOCUMENTS

WO PCT/EP01/09643 * 3/2002

(Continued)

OTHER PUBLICATIONS

Forrest, Stephanie et al. "Computer Immunology." Communications of the ACM. vol. 40, Issue 10, pp. 88-96. Oct. 1997.*

(Continued)

*Primary Examiner*—Jason Cardone
*Assistant Examiner*—Jeffrey R. Swearingen
(74) *Attorney, Agent, or Firm*—Zilka-Kotab, PC; Christopher J. Hamaty (57) ABSTRACT

A system and method for distributing portable computer virus definition records with binary file conversion are described. One or more virus definition records are stored into a structured virus database. Each virus definition record includes an identifier uniquely identifying a computer virus, at least one virus name associated with the computer virus, a virus definition sentence comprising object code providing operations to detect the identified computer virus within a computer system, and a virus removal sentence comprising object code providing operations to clean the identified computer virus from the computer system. At least one updated virus definition record is stored into the structured virus database indexed by the identifier and the at least one virus name for each virus definition record. The virus definition records stored in the structured virus database are converted into a virus data file. The virus data file includes virus definition sets. Each virus definition set includes binary data encoding instructions to detect the computer virus within a computer system, instructions to clean the computer virus from the computer system, and names associated with the computer virus.

15 Claims, 8 Drawing Sheets

U.S. PATENT DOCUMENTS

| | | | |
|---|---|---|---|
| 6,279,113 B1 * | 8/2001 | Vaidya | 713/201 |
| 6,314,425 B1 * | 11/2001 | Serbinis et al. | 707/10 |
| 6,338,141 B1 * | 1/2002 | Wells | 713/200 |
| 6,357,008 B1 * | 3/2002 | Nachenberg | 713/200 |
| 6,397,335 B1 * | 5/2002 | Franczek et al. | 713/200 |
| 6,622,150 B1 | 9/2003 | Kouznetsov et al. | 707/200 |
| 6,785,732 B1 * | 8/2004 | Bates et al. | 709/232 |
| 6,802,028 B1 * | 10/2004 | Ruff et al. | 714/38 |
| 6,851,057 B1 * | 2/2005 | Nachenberg | 713/200 |
| 2005/0283837 A1 * | 12/2005 | Olivier et al. | 726/24 |

FOREIGN PATENT DOCUMENTS

WO    WO 02/19067 A2 *   3/2002

OTHER PUBLICATIONS

Damaris Christensen Titled "Beyond Viral Vaccination" Science news online www.sciencenews.org/sn_arc99/7_31_99/bob2.htm Jul. 31, 1999, pp. 1-4.*

Company News "Kaspersky Lab: What it is and what it will be" Dec. 28, 2000 www.viruslist.com.*

Kaspersky Lab, "Kaspersky Lab: What is and What Will Be," www.viruslist.com, Dec. 10, 2002, pp. 1-4.

Christenson Damaris, "Beyond Virtual Vaccinations," www.sciencenews.org. pp. 1-4, Jul. 31, 1999.

Office Action Summary from U.S. Appl. No. 09/740,294 which was mailed on Dec. 19, 2002.

* cited by examiner

SYSTEM AND METHOD FOR DISTRIBUTING PORTABLE COMPUTER VIRUS DEFINITION RECORDS WITH BINARY FILE CONVERSION

FIELD OF THE INVENTION

The present invention relates in general to computer anti-virus detection and distribution and, in particular, to system and method for distributing portable computer virus definition records with binary file conversion.

BACKGROUND OF THE INVENTION

Computer viruses are program code usually causing malicious and often destructive results. All computer viruses are self-replicating. More precisely, computer viruses include any form of self-replicating computer code which can be stored, disseminated, and directly or indirectly executed. Computer viruses can be disguised as application programs, functions, macros, electronic mail attachments, and even applets and in hypertext links.

Computer viruses travel between machines via infected media or over network connections disguised as legitimate files or messages. The earliest computer viruses infected boot sectors and files. Over time, computer viruses evolved into numerous forms and types, including cavity, cluster, companion, direct action, encrypting, multipartite, mutating, polymorphic, overwriting, self-garbling, and stealth viruses, such as described in "MCAFEE.com: Virus Glossary of Terms," NETWORKS ASSOCIATES TECHNOLOGY, Inc., (2000), the disclosure of which is incorporated by reference. Most recently, macro viruses have become increasingly popular. These viruses are written in macro programming languages and are attached to document templates or as electronic mail attachments.

Historically, anti-virus solutions have reflected the sophistication of the viruses being combated. The first anti-virus solutions were stand-alone programs for identifying and disabling viruses. Eventually, anti-virus solutions grew to include specialized functions and parameterized variables that could be stored in a data file. During operation, the data file was read by an anti-virus engine operating on a client computer. Finally, the specialized functions evolved into full-fledged anti-virus languages for defining virus scanning and cleaning, including removal and disablement, instructions.

Presently, most anti-virus companies store the anti-virus language code for each virus definition into data files. For efficiency, the source code is compiled into object code at the vendor site. The virus definitions, including the object code, are then stored into the data files. To speed virus detection, the virus definitions are organized for efficient retrieval often as unstructured binary data.

Anti-virus companies are continually discovering new computer viruses on a daily basis and must periodically distribute anti-virus software updates. Each update augments the data file with new computer virus definitions, as well as replacing or deleting old virus definitions. Over time, however, the size of the data files tend to become large and can take excessive amounts of time to download. Long download times are particularly problematic on low bandwidth connections or in corporate computing environments having a large user base.

Consequently, one prior art approach to decreasing anti-virus data file downloading times determines and transfers only the changes between old and new data files. The anti-virus company first compares old and new data files and forms a binary delta file. The delta file is downloaded by users and a patching utility program converts the old data file into the new data file by replacing parts of the binary data file. While this approach can often decrease the amount of data to be downloaded, the sizes of the delta files are arbitrary and vary greatly, depending upon the differences in binary data. In the worst case, the old and new data files are completely different and the delta file effectively replicates the new data file, thereby saving no download time.

While the use of delta files can effect throughput, changing the format of data files, particularly in a corporate computing environment, to avoid the use of delta files would create a further concern with respect to maintaining backward compatibility. Any new data file format change would necessitate replacing the existing data files on fielded client computers at potentially high cost due to downloads and installation.

Therefore, there is a need for an approach to efficiently distributing virus definitions to allowing updating in a backward compatible manner. Preferably, such an approach would store virus definitions maintained as indexed records in a database management system coupled with the ability to convert the virus definitions between formats. Such an approach would allow efficient virus definition updating while preserving existing data file formats.

SUMMARY OF THE INVENTION

The present invention provides a system and method for sharing computer virus definition data in a backward compatible manner using a structured virus database. On a client, a structured virus database is maintained for storing virus definition records. Each record has a unique identifier, one or more virus names, and object code "sentences" defining operations for detecting the presence of and for removing a compute virus. The records are converted into a virus data file storing virus definitions. Each definition includes binary sentences defining virus detection and cleaning operations and identifies the computer viruses by name. Periodically, delta sets of virus definition records are retrieved. Each of the records is processed to add, delete, or replace records in the database after which the database is again converted into an updated virus data file.

An embodiment of the present invention is a system and method for distributing portable computer virus definition records with binary file conversion. One or more virus definition records are stored into a structured virus database. Each virus definition record includes an identifier uniquely identifying a computer virus, at least one virus name associated with the computer virus, a virus definition sentence comprising object code providing operations to detect the identified computer virus within a computer system, and a virus removal sentence comprising object code providing operations to clean the identified computer virus from the computer system. At least one updated virus definition record is stored into the structured virus database indexed by the identifier and the at least one virus name for each virus definition record. The virus definition records stored in the structured virus database are converted into a virus data file. The virus data file includes virus definition sets. Each virus definition set includes binary data encoding instructions to detect the computer virus within a computer system, instructions to clean the computer virus from the computer system, and names associated with the computer virus.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
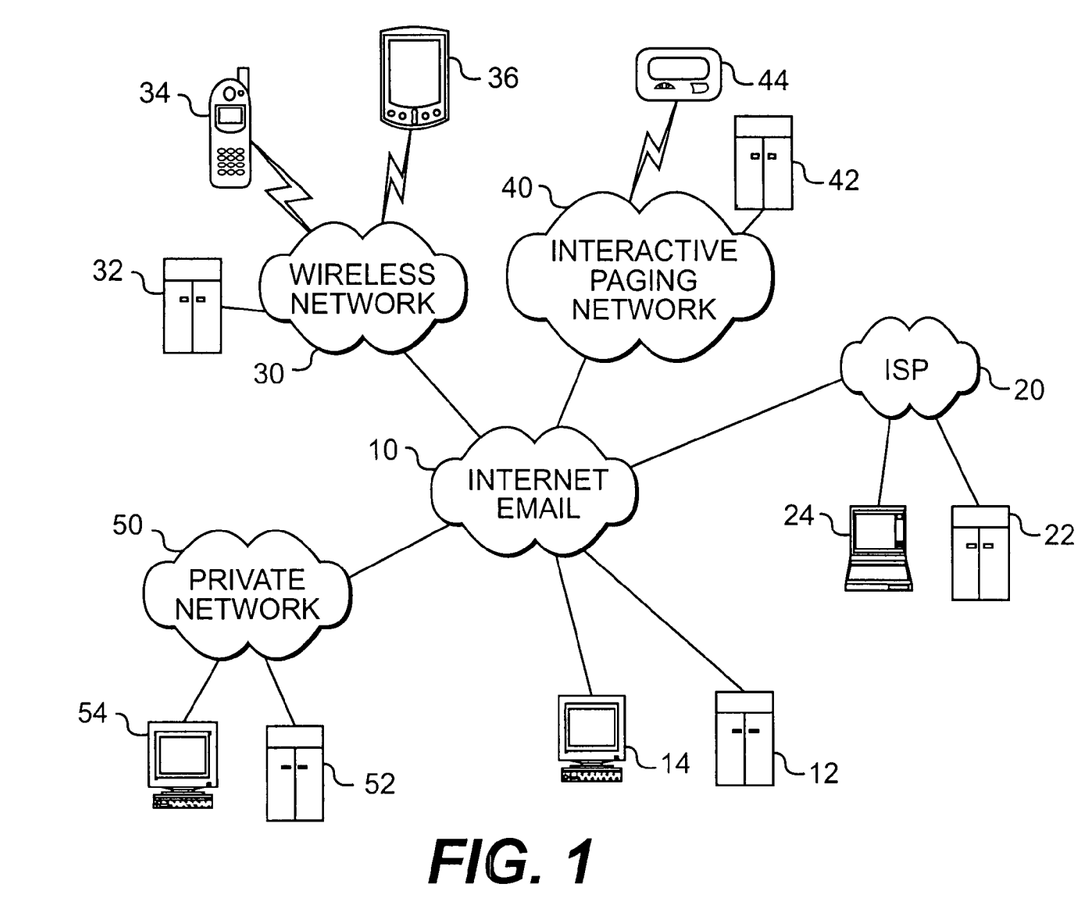
FIG. 1 is a block diagram showing a networked computing environment, including a system for distributing portable computer virus definition records with binary file conversion, in accordance with the present invention.

FIG. 1 is a block diagram showing a networked computing environment 10, including a system for distributing portable computer virus definition records with binary file conversion, in accordance with the present invention. The networked computing environment 10 includes a server 11 interconnected to a client 12 via an internetwork 13. The server 11 provides client services, such as information retrieval and file serving. Alternatively, the interconnection could be with a direct connection, over a dialup connection, via an intranetwork, or by a combination of the foregoing or with various other network configurations and topologies, as would be recognized by one skilled in the art.

The server 11 includes a persistent store kept on a file system 18 maintained on a server storage device 14. Individual directories, files, and databases are stored in the file system 18. Suitable persistent storage devices include randomly accessible devices, such as hard drives and rewriteable media, although other forms of persistent storage devices could also be used by or incorporated into the server 11. Similarly, the client 12 also includes a persistent store kept on a file system 19 maintained on a client storage device 15.

The client 12 can potentially be exposed to computer viruses by virtue of having interconnectivity with outside machines. As protection, the client 12 includes an anti-virus system 17 (AVS) that executes operations to scan for the presence of and to clean off any computer viruses. An exemplary anti-virus system 17 is the VirusScan product, licensed by Networks Associates Technology, Inc., Santa Clara, Calif. As further described below beginning with reference to FIG. 2, the anti-virus system 17 converts virus definition records stored in a virus database into a data file storing virus definition sets for subsequent use in performing virus scanning and cleaning.

The virus database must be periodically updated with new computer virus definitions to enable the anti-virus system 17 to continue to provide up-to-date anti-virus protection. Thus, the server 11 includes an anti-virus support system 16 (AVSS) that executes an updating service. The client 12 can connect to the server 11 and download updated virus definition records from the anti-virus support system 16.

The individual computer systems, including server 11 and client 12, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
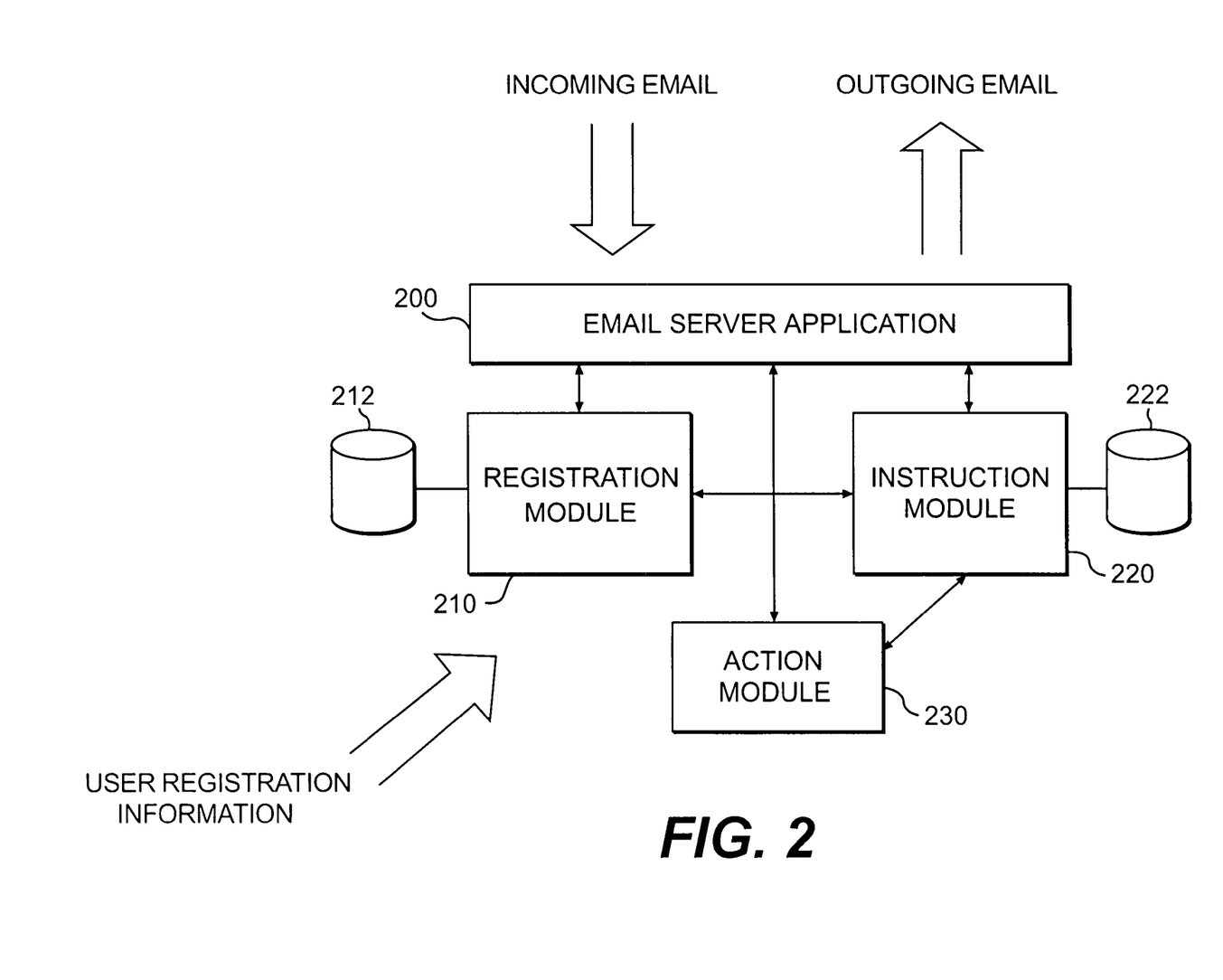
FIG. 2 is a block diagram showing a system for distributing portable computer virus definition records with binary file conversion.

FIG. 2 is a block diagram showing a system 30 for distributing portable computer virus definition records with binary file conversion. The system 30 includes the server 11 and client 12 with persistent storage devices. The client 12 executes an anti-virus system 17 and periodically interfaces to the anti-virus support system 16 executing on the server 11 over the internetwork 13, or other such form of interconnection, to receive anti-virus updates in the form of virus definition records. The anti-virus system 17 incorporates functionality (not shown) to scan and clean the client 12 using a data file storing conventional virus definitions. A related approach to addressing computer viruses using a structured virus database is described in commonly assigned U.S. patent application Ser. No. 09/740,294, entitled "System And Method For Efficiently Managing Computer Virus Definitions Using A Structured Virus Database," filed Dec. 18, 2000, pending, the disclosure of which is incorporated by reference.

The anti-virus system 17 consists of two functional modules: a converter 34 and a database engine 35. The anti-virus support system 16 consists of two functional modules: a compiler 31 and a database engine 32. Each module is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The anti-virus support system 16 and the anti-virus system 17 operate in accordance with a sequence of process steps, as further described below with reference to FIGS. 8 and 9, respectively.

The database engine 35 maintains a structured virus database 40 storing virus definition records. The converter 34 converts the stored virus definition records into conventional virus definitions for use in scanning for and cleaning off computer viruses. The structured virus database 40 is preferably organized as a relational database, as further described below with reference to FIG. 5. In the described embodiment, each new set of computer viruses results in the generation of a logically updated structured master virus database 37. To minimize download time and the amount of information transferred over the internetwork 13, only the updated virus definition records are sent to the client 12. The database engine 34 modifies the local virus database 40 by adding, removing or replacing existing virus definition records. The converter 34 then converts the structured virus database 40 into virus definition files stored as a set of data (DAT) files 41. The data file set 41 is used by an anti-virus engine (not shown) to scan and clean the client 12.

The anti-virus support system 16 provides virus definition updates through the database engine 32. The updated virus definition records are selected from the logical sets of structured master virus databases 37. The structured master virus databases 37 are also preferably organized as relational databases, as further described below with reference to FIG. 5. The client 12 preferably pulls the updated virus definition records from the server 11 on a periodic basis in accordance with a security policy. However, the server 11 could also push the updated virus definition records or employ some form of active polling to subscribing clients.

The structured master virus databases 37 are generated by the compiler 31 and database engine 32 from raw virus definitions 37. Each virus definition includes source code written in an anti-virus language for defining virus scanning and cleaning, including removal and disablement, instructions. The compiler 31 converts each set of source code instructions into object code sentences for execution by an anti-virus engine. Preferably, one object code sentence for virus detection and a second object code sentence for virus cleaning are generated. The database engine 32 then builds the virus definition records of the structured master virus databases 37 and populates each virus definition record with the object code sentences.

In an alternate embodiment, the server 11 and client 12 also respectively include a decompiler 33, 36. The decompilers 33, 36 on both systems convert each virus definition set in the virus data file into a virus definition record for incorporation into their respective structured databases. Thus, the decompilers 33, 36 provide an additional layer of backward compatibility, allowing the virus definitions stored in old virus data files 39, 41 to be reused.

Figure 3A:
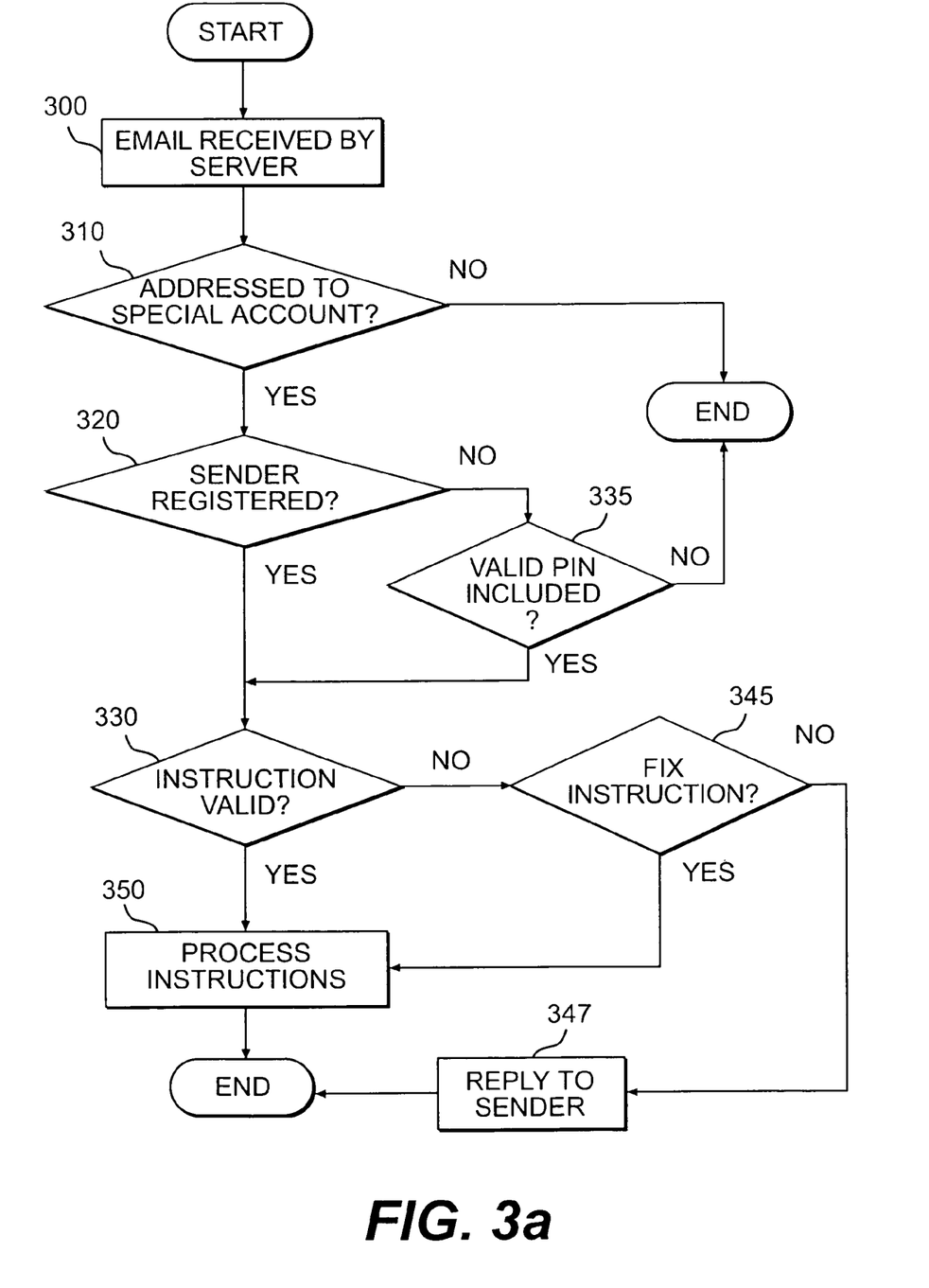
FIGS. 3A–3B are process diagrams showing, by way of example, the updating of a virus data file from virus definition sets.

FIG. 3A is a process diagram 50 showing, by way of example, the updating of a virus data file 64 from virus definition sets 51–55. Two sets of virus definitions represent subsequent virus updates which are maintained by the server 11 (shown in FIG. 1). The first group, consisting of virus definitions 51–53, is compiled (step 56) by compiler 31 and built into virus definition records stored in structured master virus database 'A' 58. Similarly, the second group, consisting of virus definitions 54–55, is compiled (step 57) by compiler 31 and built into virus definition records stored in structured master virus database 'B' 59.

Upon a periodic update cycle, the database engine 32 determines (step 60) the delta set of virus definition records 61 between structured master virus database 'A' 58 and structured master virus database 'B' 59. The client 12 (also shown in FIG. 1) downloads (step 62) the delta virus definition records set 61. These records are then stored into the structured virus database 40 by the database engine 35. Finally, the converter 34 converts the updated records into virus definitions and stores the virus definitions (step 63) into the virus data file 64.

In the described example, the structured master virus database 'A' 58 and structured master virus database 'B' 59 are separate database file. However, in practice, these two databases would preferably be maintained as a single database file and each updated virus database would be logically defined by selecting out new, changed, or deleted virus definition records.

Figure 3B:
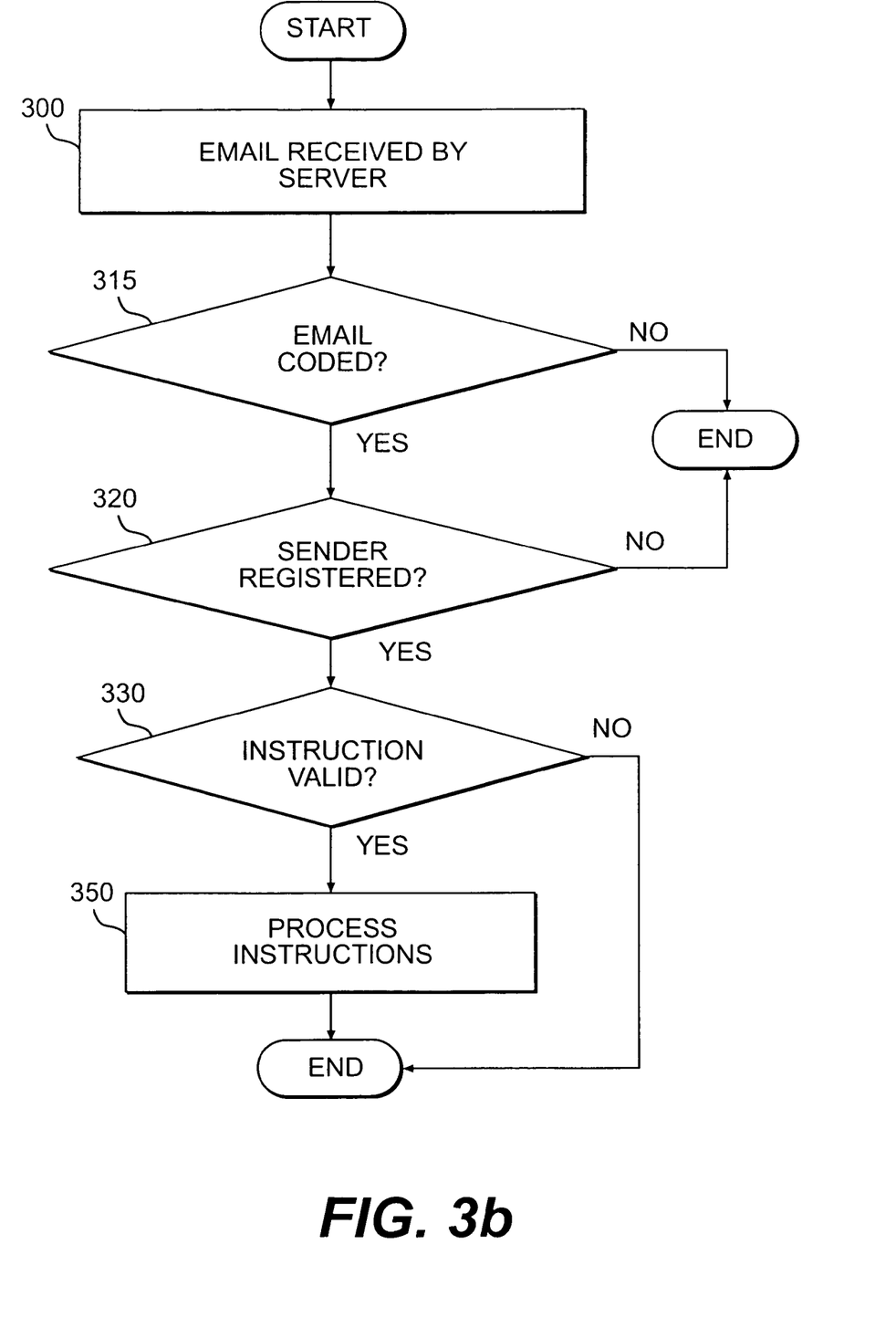

FIG. 3B also is a process diagram 70 showing, by way of example, the updating of a virus data file 90 from virus definition sets 71–75 using the alternate embodiment. As before, two sets of virus definitions, group 71–73 and 74–75, represent subsequent virus updates with the first group. Each of these groups are assembled (steps 76 and 77) by the anti-virus support system 31 into virus data files 78 and 79, respectively. The virus definitions in each virus data files 78 and 79 are compiled (steps 80 and 81) by compiler 31 and built into virus definition records stored in structured master virus database 'A' 82 and structured master virus database 'B' 83, respectively.

Upon a periodic update cycle, the database engine 32 determines (step 84) the delta set of virus definition records 85 between structured master virus database 'A' 82 and structured master virus database 'B' 83. The client 12 (also shown in FIG. 1) downloads (step 86) the delta virus definition records set 85. These records are then stored into the structured virus database 40 by the database engine 35. In addition, if old virus data files 87 are used or maintained by the client 12, the decompiler 36 converts the virus definitions in the virus data files 87 into virus definition records and the database engine 35 also stores (step 88) the converted virus definitions into the structured virus database 40. Finally, the converter 34 converts the updated records into virus definitions and stores the virus definitions (step 89) into the virus data file 90.

Figure 4:
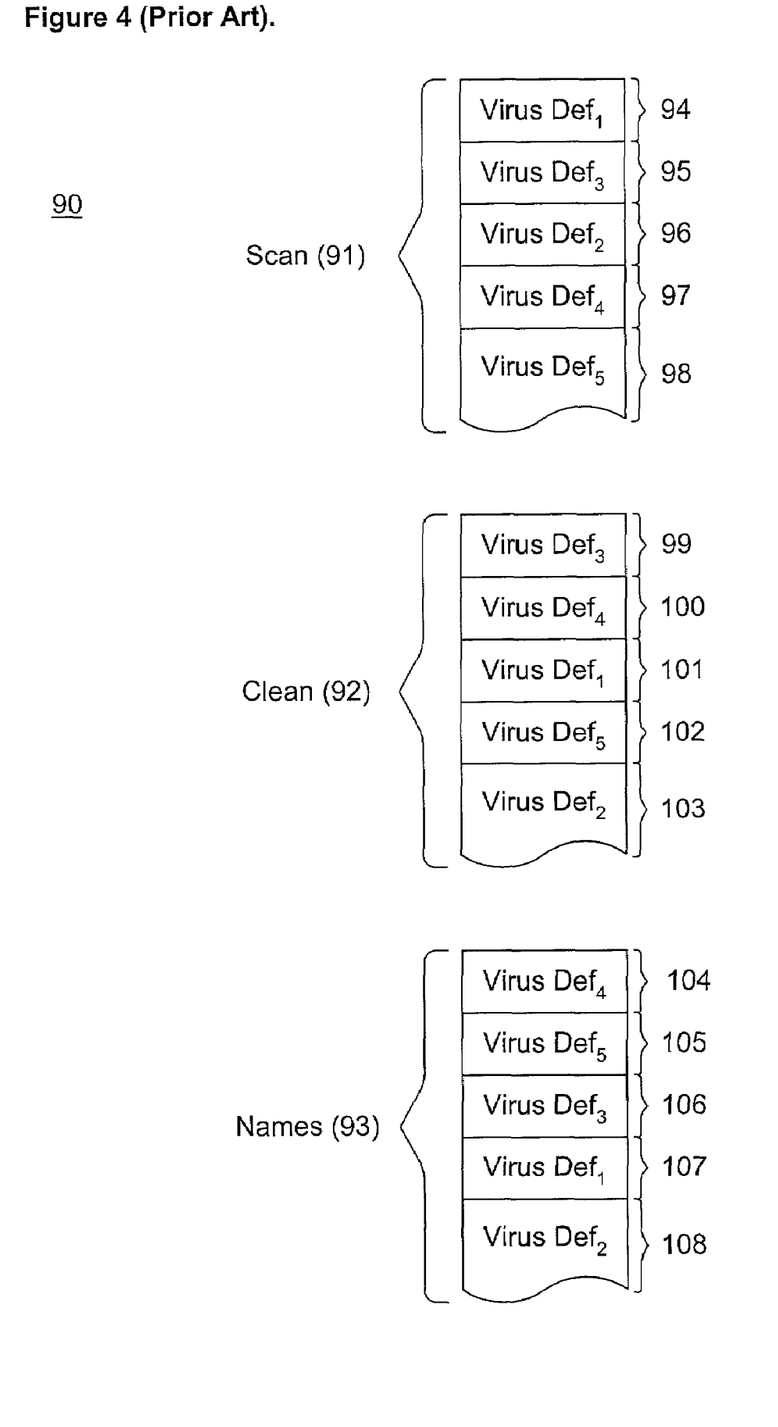
FIG. 4 is a block diagram showing the format of a prior art data file storing virus definition sets.

FIG. 4 is a block diagram showing the format 90 of a prior art data file storing virus definition sets 91–93. For optimization and to speed virus scanning, the data file 90 logically consists of three individual virus definition sets: scan 91, clean 92, and names 93. Alternatively, the virus definition sets could also be stored in a single data file. The scan virus definition set 91 binary data encoding instructions to detect a computer virus on a target machine. Likewise, the clean virus definition set 91 stores binary data encoding instructions to clean a computer virus from an infected machine. The encoded instructions are preferably in the form of object code generated by a compiler for compiling raw anti-virus language source code. The names virus definition set 93 stores descriptive names corresponding to each virus.

To further optimize performance, the individual virus definitions 94–108 are ordered within their respective virus definition set for optimal retrieval. Thus, the scan virus definition set 91 stores the virus definitions 94–98 in order of first, third, second, fourth, and fifth viruses. Similarly, the clean virus definition set 92 stores virus definitions 99–103 in order of third, fourth, first, fifth, and second viruses, while the names virus definition set 93 stores virus definitions 104–108 in order of fourth, fifth, third, first, and second viruses. Other orderings or forms of organization are feasible.

The prior art data file 90 is divided and organized to optimize virus scanning and cleaning performance. However, this format is difficult to maintain due to the arbitrary orderings of virus definitions within their respective virus definition sets and by virtue of the binary nature of the stored data. As new virus definitions can be inserted into any arbitrary location within each virus definition set, binary patch utilities often end up replacing a substantially large portion of a virus definition set.

Figure 5:
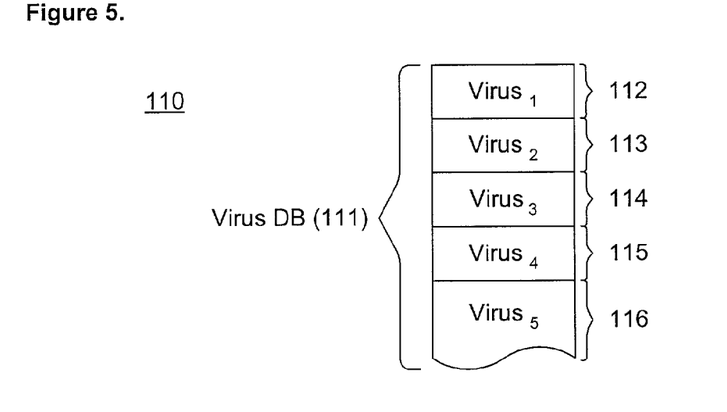
FIG. 5 is a block diagram showing the format of a structured virus database storing virus definition records for use in the system of FIG. 2.

FIG. 5 is a block diagram showing the format 110 of a structured virus database 111 storing virus definition records 112–116 for use in the system of FIG. 2. The structured virus database 111 is organized to store virus definition records 112–116 in an ordered and indexed fashion amenable to rapid access and efficient maintenance. The structured virus database 111 is preferably a relational database, such as supported by the Oracle relational database management system, version 8i, licensed by Oracle Corporation, Redwood Shores, Calif.

Figure 6:
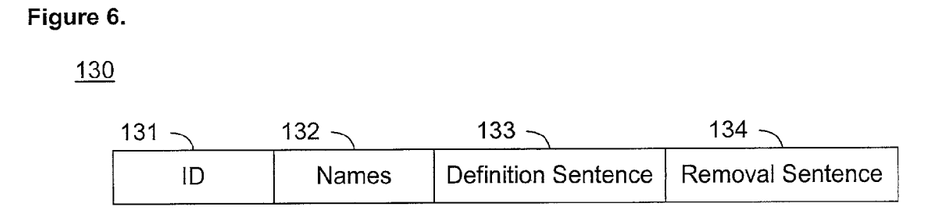
FIG. 6 is a block diagram showing the format of a virus definition record as stored in the structured virus database of FIG. 5.

FIG. 6 is a block diagram showing the format of a virus definition record 130 as stored in the structured virus database 111 of FIG. 5. Each record 130 consists of four fields: identifier (ID) 131, names 132, definition sentence 133, and removal sentence 134. The identifier field 131 uniquely identifies the computer virus described by the record 130. The names field 132 contains at least one virus name associated with the computer virus. The definition sentence 133 stores object code that provides operations to detect the computer virus within the machine being scanned. Finally, the virus removal sentence 134 stores object code providing operations to clean the identified computer virus from the scanned machine. Other database schemas and record formats could also be used.

Figure 7:
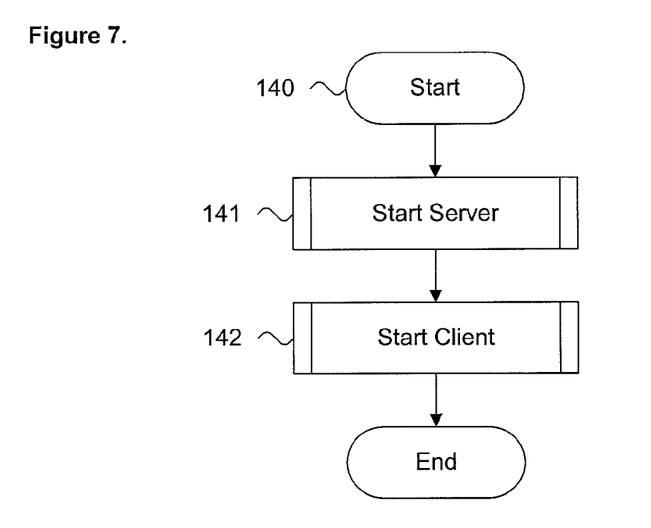
FIG. 7 is a flow diagram showing a method for distributing portable computer virus definition records with binary file conversion in accordance with the present invention.

FIG. 7 is a flow diagram showing a method for distributing portable computer virus definition records with binary file conversion 140 in accordance with the present invention. The method logically starts the operations performed by the server 11 (block 141) and client 12 (block 142), as further described below in FIGS. 8 and 9, respectively. In practice, the server 11 and client 12 operate independently without express synchronization or coordination. However, both systems must be operating to perform a virus database updating procedure.

Figure 8:
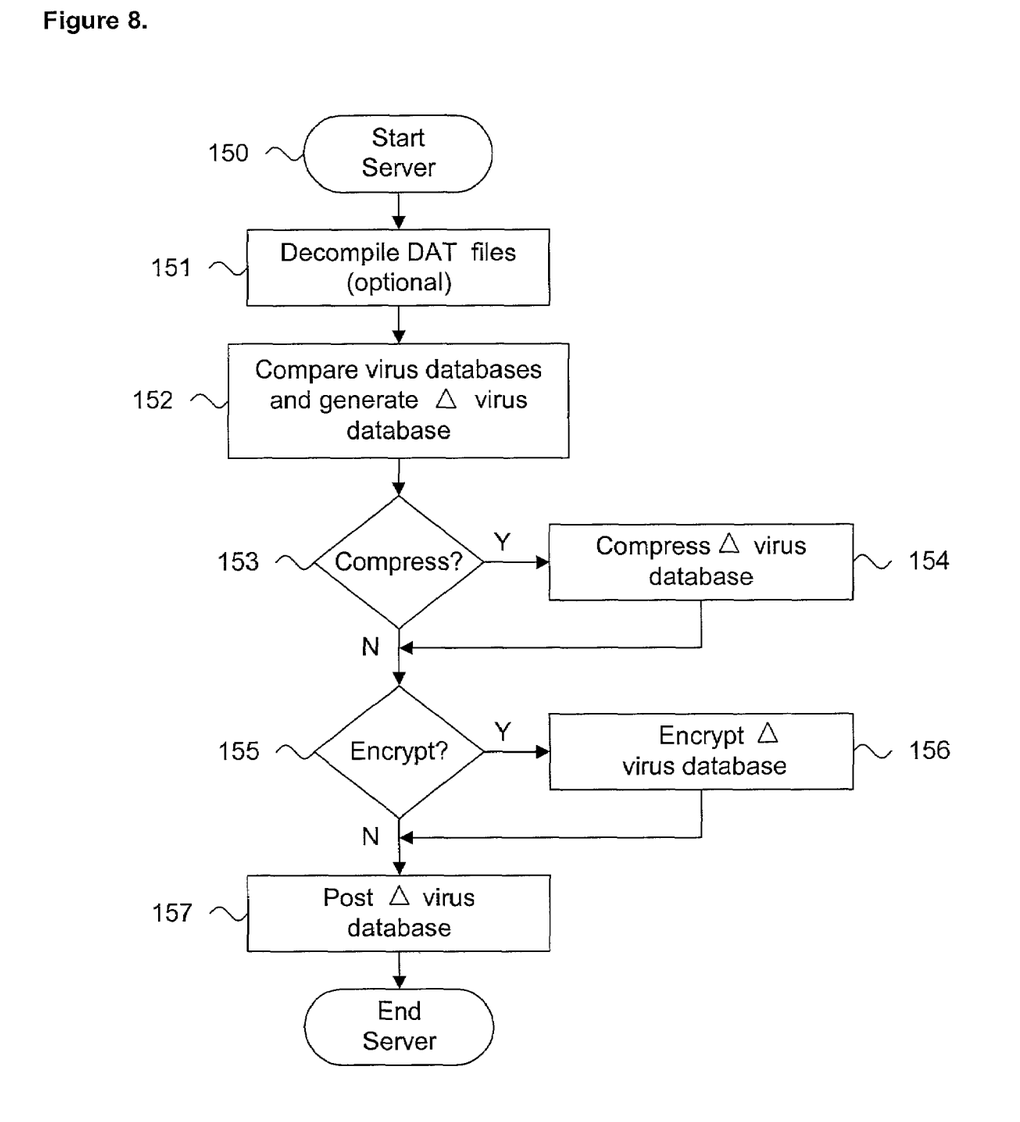
FIG. 8 is a flow diagram showing a routine for starting a server for use in the method of FIG. 7.

FIG. 8 is a flow diagram showing a routine 150 for starting a server for use in the method of FIG. 7. The purpose of this routine is to process virus definition updates for retrieval by clients. First, the structured virus databases 38 (shown in FIG. 2) are compared and a delta set of virus definition records 61 (shown in FIG. 3A) is generated (block 151). The delta set is then posted (block 157), after which the routine ends. Note that this routine is restarted whenever necessary to update the structured master virus database 38 with new virus definitions 37.

In an alternate embodiment, the virus definitions are stored in virus data files 39 (also shown in FIG. 2) and must first be decompiled into individual virus definition records for storage into the structured master virus databases 38. In a further alternate embodiment, the delta set is compressed (blocks 153–154) and, optionally, encrypted (blocks 155–156), using standard data compression and encryption procedures as are known in the art. Since the structured master virus database 38 is a structured database file, the data is stored in a physically ordered fashion, rather than in an arbitrary fashion as provided for pure binary data. Consequently, the structured master virus database 38 is better suited for compression, thereby decreasing the network bandwidth necessary to download a database update. Similarly, encryption provides heightened security.

Figure 9:
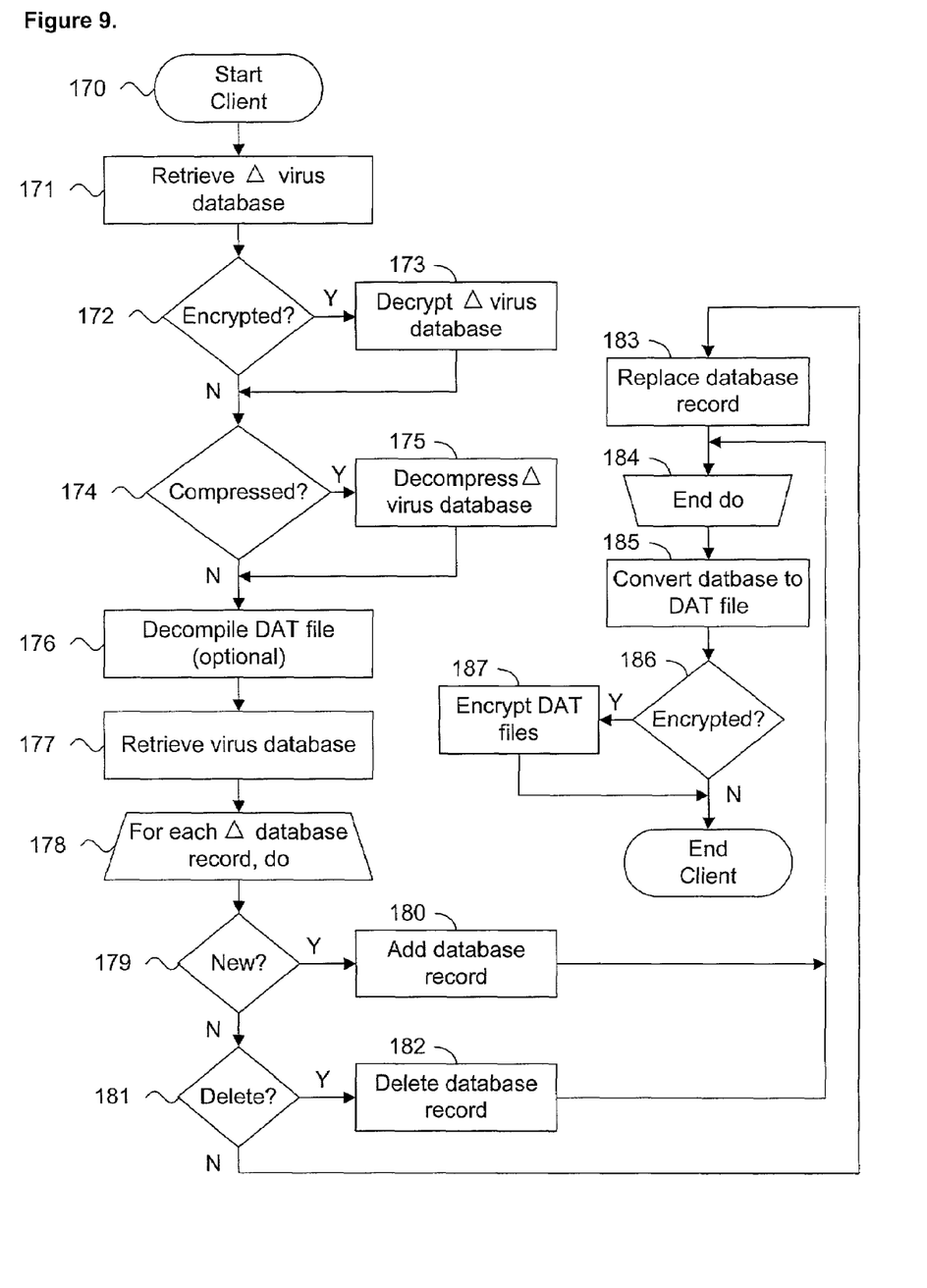
FIG. 9 is a flow diagram showing a routine for starting a client for use in the method of FIG. 7.

FIG. 9 is a flow diagram showing a routine 170 for starting a client for use in the method of FIG. 7. The purpose of this routine is to retrieve virus definition updates from a server and to update a virus data file. First, a delta set 61 is retrieved from the server 11 (block 171). If the delta set 61 is encrypted (block 172), the file is decrypted (block 173). Similarly, if the delta set 61 is compressed (block 174), the file is decompressed (block 175).

Next, the local virus database 40 (shown in FIG. 2) is retrieved (block 177 and each virus definition record 130 (shown in FIG. 6) in the delta set 61 is iteratively processed (blocks 178–184) as follows. During each iteration (block 178), if the virus definition record 130 is new (block 179), the record is added to the structured virus database 40 (block 180). Similarly, if the virus definition record 130 was deleted (block 181), the corresponding record is deleted from the structured virus database 40 (block 182). Otherwise, if the virus definition record 130 is neither new nor deleted (blocks 179, 181), the corresponding record in the structured virus database 40 is replaced (block 183). The addition, deletion, and replacement operations (blocks 179–183) are repeated (block 184) until all records have been processed.

For backward compatibility, the virus definition records stored in the updated structured virus database 40 are converted into virus definitions and stored into a set of virus data files 41, after which the routine ends. Note that this routine is also restarted whenever necessary, and preferably on a periodic basis, to update the structured master virus database 40 with new virus definitions 37.

As with the server routine 150, in an alternate embodiment, the delta set 61 can be encrypted (blocks 172–173) and compressed (blocks 174–175). Finally, in a further alternate embodiment, the virus data files set 41 can be encrypted (blocks 186–187) for heightened security.

While the invention has been particularly shown and described as referenced to the embodiments thereof, those skilled in the art will understand that the foregoing and other changes in form and detail may be made therein without departing from the spirit and scope of the invention.

What is claimed is:

1. A system for distributing portable computer virus definition records with binary file conversion, comprising:
   a structured virus database storing one or more virus definition records, each virus definition record comprising:
      an identifier uniquely identifying a computer virus;
      at least one virus name associated with the computer virus;
      a virus definition sentence comprising object code providing operations to detect the identified computer virus within a computer system; and
      a virus removal sentence comprising object code providing operations to clean the identified computer virus from the computer system;
   a client database engine storing at least one updated virus definition record into the structured virus database indexed by the identifier and the at least one virus name for each virus definition record;
   a converter converting the virus definition records stored in the structured virus database into a virus data file comprising virus definition sets, each virus definition set comprising:
      binary data encoding instructions to detect the computer virus within a computer system, wherein the instructions comprise the object code to detect the identified computer virus;
      binary data encoding instructions to clean the computer virus from the computer system, wherein the instructions comprise the object code to clean the identified computer virus; and
      names associated with the computer virus;
   a client anti-virus language decompiler converting each virus definition set in the virus data file into a virus definition record; and
   a server database engine comparing subsequently modified versions of the structured virus database to form a delta set of virus definition records, wherein the client database engine stores the delta virus definition records set into the structured virus database;

wherein the server database engine builds the virus definition records into the structured virus database by generating the identifier for each virus definition record and populating each virus definition record with the virus definition sentence and the virus removal sentence for the computer virus;

wherein at least one of the database engines accesses the virus definition records in the structured virus database to perform at least one of adding, removing, and replacing a virus definition record.

2. A system according to claim 1, further comprising:
a server anti-virus language decompiler converting each virus definition set in the virus data file into a virus definition record.

3. A system according to claim 1, further comprising:
a compression module compressing the structured virus database prior to transfer; and
a decompression module decompressing the structured virus database subsequent to transfer.

4. A system according to claim 1, further comprising:
an encryption module encrypting the structured virus database prior to transfer; and
a decryption module decrypting the structured virus database subsequent to transfer.

5. A system according to claim 1, wherein the structured virus database is a relational database.

6. A system according to claim 1, wherein each virus definition set further includes descriptive names corresponding to each computer virus.

7. A system according to claim 1, wherein each virus definition set includes a plurality of ordered virus definitions.

8. A system according to claim 7, wherein the plurality of virus definitions are ordered for optimal retrieval.

9. A system according to claim 1, wherein the virus data file is encrypted.

10. A method for distributing portable computer virus definition records with binary file conversion, comprising:
storing one or more virus definition records into a structured virus database, each virus definition record comprising:
an identifier uniquely identifying a computer virus;
at least one virus name associated with the computer virus;
a virus definition sentence comprising object code providing operations to detect the identified computer virus within a computer system; and
a virus removal sentence comprising object code providing operations to clean the identified computer virus from the computer system;
storing at least one updated virus definition record into the structured virus database indexed by the identifier and the at least one virus name for each virus definition record;
converting the virus definition records stored in the structured virus database into a virus data file comprising virus definition sets, each virus definition set comprising:
binary data encoding instructions to detect the computer virus within a computer system, wherein the instructions comprise the object code to detect the identified computer virus;
binary data encoding instructions to clean the computer virus from the computer system, wherein the instructions comprise the object code to clean the identified computer virus; and
names associated with the computer virus;
comparing subsequently modified versions of the structured virus database to form a delta set of virus definition records; and
storing the delta virus definition records set into the structured virus database;
wherein a client anti-virus language decompiler converts each virus definition set in the virus data file into a virus definition record;
wherein a server database engine builds the virus definition records into the structured virus database by generating the identifier for each virus definition record and populating each virus definition record with the virus definition sentence and the virus removal sentence for the computer virus;
wherein the server database engine accesses the virus definition records in the structured virus database to perform at least one of adding, removing, and replacing a virus definition record.

11. A method according to claim 10, further comprising:
compressing the structured virus database prior to transfer; and
decompressing the structured virus database subsequent to transfer.

12. A method according to claim 10, further comprising:
encrypting the structured virus database prior to transfer; and
decrypting the structured virus database subsequent to transfer.

13. A method according to claim 10, wherein the structured virus database is a relational database.

14. A computer-readable storage medium holding code for performing the method of claim 10.

15. A method for updating a binary computer virus data file from virus definition records stored in a structured virus database, comprising:
means for storing virus definition records into a structured virus database, each virus definition record comprising an identifier, at least one virus name, a virus definition sentence defining operations to detect the identified computer virus, and a virus removal sentence defining operations to clean off the identified computer virus;
means for comparing subsequently modified versions of the structured virus database to form a delta set of virus definition records;
means for storing the delta virus definition records set into the structured virus database;
means for converting the virus definition records stored in the structured virus database into a virus data file comprising virus definition sets, each virus definition set comprising binary instructions wherein the binary instructions comprise the object code to detect the computer virus, binary instructions wherein the binary instructions comprise the object code to clean off the computer virus, and names associated with the computer virus;
means for comparing subsequently modified versions of the structured virus database to form a delta set of virus definition records;
means for storing the delta virus definition records set into the structured virus database;
means for building the virus definition records into the structured virus database by generating the identifier for each virus definition record and populating each virus definition record with the virus definition sentence and the virus removal sentence for the computer virus;

means for converting each virus definition set in the virus data file into a virus definition record; and means for accessing the virus definition records in the structured virus database to perform at least one of adding, removing, and replacing a virus definition record.

* * * * *